(12) United States Patent
Hertzog et al.

(10) Patent No.: US 11,707,008 B2
(45) Date of Patent: Jul. 25, 2023

(54) METHOD FOR ADJUSTING THE WORKING DEPTH OF AN AGRICULTURAL IMPLEMENT

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Vastervik (SE); Carl Ola Fredrik Nilsson, Vastervik (SE); Robert Svensson, Loftahammar (SE); Rickard Karl Gustav Nåhdin, Gamleby (SE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 568 days.

(21) Appl. No.: 16/842,882

(22) Filed: Apr. 8, 2020

(65) Prior Publication Data
US 2020/0337204 A1    Oct. 29, 2020

(30) Foreign Application Priority Data

Apr. 25, 2019   (EP) ..................................... 19171124

(51) Int. Cl.
| A01B 63/111 | (2006.01) |
| A01B 15/14 | (2006.01) |
| A01B 63/24 | (2006.01) |
| A01B 79/00 | (2006.01) |
| A01B 63/114 | (2006.01) |
| A01B 63/00 | (2006.01) |

(52) U.S. Cl.
CPC ............ *A01B 63/111* (2013.01); *A01B 15/14* (2013.01); *A01B 63/008* (2013.01); *A01B 63/114* (2013.01); *A01B 63/245* (2013.01); *A01B 79/005* (2013.01)

(58) Field of Classification Search
CPC ... A01B 63/111; A01B 63/008; A01B 63/114; A01B 63/245; A01B 79/005; A01B 15/14
See application file for complete search history.

(56) References Cited

FOREIGN PATENT DOCUMENTS

| DE | 3611414 A1 | * 10/1987 |
| DE | 102007026279 A1 | 12/2008 |
| EP | 0169619 A2 | 1/1986 |

(Continued)

OTHER PUBLICATIONS

Extended European Search Report for EP Application No. 19171124.1 dated Oct. 31, 2019 (seven pages).

*Primary Examiner* — Tara Mayo
(74) *Attorney, Agent, or Firm* — Rebecca Henkel; Rickard DeMille

(57) ABSTRACT

The present disclosure relates to a method for adjusting a working depth of a plough implement, the plough implement comprising a plurality of ground engaging tools for penetrating and moving soil and a depth adjustment apparatus configured to adjust a working depth of at least one of the ground engaging tools, wherein the method comprises receiving control-data indicative of at least one of an operation the plough implement or a field condition of a field across which the plough implement is moved; and automatically controlling an operation of the depth adjustment apparatus in a manner that adjusts a working depth of the at least one ground engaging tool on the basis of the control-data received.

12 Claims, 9 Drawing Sheets

(56) References Cited

FOREIGN PATENT DOCUMENTS

| | | |
|---|---|---|
| EP | 1273216 A1 | 1/2003 |
| EP | 3050416 A1 | 8/2016 |
| EP | 3395136 | 10/2018 |
| EP | 3434087 A1 | 1/2019 |
| GB | 2500198 A | 9/2013 |
| WO | 2015057080 A1 | 4/2015 |

* cited by examiner

METHOD FOR ADJUSTING THE WORKING DEPTH OF AN AGRICULTURAL IMPLEMENT

BACKGROUND OF THE INVENTION

The present disclosure relates to a method for adjusting a working depth of an agricultural plough, particularly, but not exclusively, a plough implement. Other aspects of the present disclosure relate to an agricultural plough, particularly, but not exclusively, a plough implement.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset manner from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased, and the plough bodies are pulled out of the soil, thereby reducing the working depth.

The ground clearance of the main frame may, for example, be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the ploughing depth.

When performing a ploughing operation, it is essential to create a uniform layer of ploughed soil at the correct depth across the field to form a proper bed for subsequent tillage or planting operations. If setting the working depth of the plough bodies too deep, the resulting furrows will be left open causing unnecessary weed growth and the fuel consumption of the agricultural machinery increases. If setting the ploughing depth too low (e.g. ploughing too shallow), weed will not be buried sufficiently to a depth at which weed seeds will not germinate.

Typically, ploughing depths vary between 10 and 30 cm but can also be set as deep as 50 cm and more for deep ploughing purposes. As a guideline, the ploughing depth should be around two thirds of the furrow width but other factors, such as the compaction of the soil, may also dictate the depth setting. Harder soils may require deeper ploughing to sufficiently loosen the compacted soil and allow for water to penetrate deeper into the ground.

Adjusting the plough implement to the correct ploughing depth is, therefore, an essential and most challenging tasks in setting the plough implement up for the ploughing operation. Experienced farmers consider a variety of parameters in deciding what the appropriate ploughing depth should be, with some of the parameters, such as a soil density or a field moisture content often not being readily available to the framer. Even if all of the required parameters are available, finding the appropriate ploughing depth often involves a tedious trial and error process.

In view of the above, there is generally a need for a simplified way of adjusting the ploughing or working depth of a plough implement.

It is an aim of the present invention to solve or at least ameliorate one or more problems of the prior art.

SUMMARY OF THE INVENTION

Aspects and embodiments of the disclosure provide a method for adjusting a working depth of a plough implement and a plough implement as claimed in the appended claims.

According to one aspect of the present disclosure, there is provided a method for adjusting the working depth of a plough implement, the plough implement comprising a plurality of ground engaging tools for penetrating and moving soil and a depth adjustment means configured to adjust the working depth of the at least one of the ground engaging tools, wherein the method comprises:

receiving control-data indicative of at least one of an operation of the plough implement or a field condition of a field across which the plough implement is being moved; and automatically controlling an operation of the depth adjustment means in a manner that adjusts a working depth of the at least one ground engaging tool on the basis of the control-data received.

In other words, the method of the present disclosure provides an automatic control of the plough depth based on information that may either relate to the operation of the plough implement itself or a condition of the field across which the plough implement is being moved. The control-data received, e.g. by a control unit, may include a multitude of parameters that either relate to the plough implement itself or the field. According to this method, it is no longer necessary for the operator to consider various parameters that may influence the working depth. Rather, the method automatically changes the working depth of the plough bodies on the basis of one or more parameters.

In an embodiment, the plough implement comprises a plurality of depth adjustment apparatus, each depth adjustment apparatus being configured to independently adjust a working depth of at least one of the plurality of ground engaging tools, and wherein automatically controlling an operation of the depth adjustment apparatus comprises controlling an operation of two or more of the depth adjustment apparatus in a manner that changes a working depth of two or more of the plurality of ground engaging tools independently of each other.

In one embodiment, the control-data comprises field-data associated with previous field conditions. According to this embodiment, the working depth adjustment is not based on live data determined during the operation of the plough implement. Rather, a control unit may access a memory or database with field information (field-data) that was collected prior to the ploughing operation. In one example, the previous prior field-data may comprise various field parameters (such as soil moisture levels, etc.) in relation to individual locations on a map. Such field-data may be acquired by the operator during previous operations on the same field, e.g. during various tillage and/or planting operations throughout the year. Alternatively, the previous field-data may be available to download and based on satellite images of the field in question.

For example, satellite images may be used to judge the contours of the field before the ploughing operation is commenced.

The previous field-data may also include ploughing depth used in previous ploughing operations. The method may include automatically setting the working depth of the at least one ground engaging tool to a different working depth than the working depth used in previous ploughing operations. It can be an advantage to have different depth from year to year. One year shallow to save energy next deep to loosen compact soil etc.

The control-data may comprise field-data indicative of characteristics of soil below a ground surface of the field across which the plough implement is being moved. Examples of such characteristics of the soil may be a moisture content of the soil, soil compaction levels of the soil, a temperature of the soil, a type of plant residues to be buried, a soil type, and/or an ability of the soil to drain water.

The above soil characteristics may be live data that is generated during the ploughing operation. In particular, the plough may include one or more soil sensors for determining one or more of the soil characteristics as the plough is driven across the field.

As will be appreciated, the above soil characteristics are independent of the ground contours of the field. In other words, the method of this embodiment may control and potentially change the working depth of the one or more ground engaging tools irrespective of the ground contours. Rather, the working depth may be altered even if the field contours remain unchanged, i.e. if the soil characteristics (e.g. the soil density) change on otherwise even grounds. According to another embodiment, the control-data comprises field-data associated with current field condition across which the plough implement is being moved. According to this embodiment, the field-data received is not or not only based on previous field conditions. Rather, the control-data may be based on live data determined by a corresponding sensor. To this end, the plough implement and/or a corresponding agricultural work vehicle may have a variety of sensors that are suitable for determining one or more of the field conditions set out in more detail below.

In another embodiment, the previous field-data is indicative of one or more of:
a moisture content of the soil;
soil compaction levels of the soil;
a temperature of the soils; and
contours of the field;
a type of plant residues to be buried;
a soil type;
an ability of the soil to drain water;
a time of the year.

In another embodiment, a plurality of candidate field-data is stored in a database and automatically controlling the operation of the depth adjustment apparatus includes receiving location data of the plough implement within the field; and using the location data to select one of the candidate field-data as the field-data. In one embodiment, the location data may be received by a GPS located on the plough implement and/or a corresponding agricultural work vehicle. The location data is then used to look-up field-data within the database that relates to the current position of the plough implement within the field. In other words, the current position of the plough implement may be matched to one of the plurality of candidate field-data in the database to retrieve the field-data applicable to the current position of the plough implement.

In another embodiment, the method may comprise retrieving and/or calculating a desired working depth for the ground engaging tool corresponding to the selected field-data. For example, the selected field-data in the current location of the plough implement may include information about the moisture content of the soil and the soil compaction levels in the current location. Based on these two field-data values, a control unit may retrieve a desired working depth from a look-up table within a database. Alternatively or additionally, a control unit may use a predetermined algorithm to calculate the desired working depth on the basis of the moisture content and the soil compaction levels in question.

In yet another embodiment, the control-data comprises implement data associated with the at least one of the operation of the plough implement. According to this embodiment, the control-data received is not or not only based on previous field conditions. Rather, the control-data may be based on live data determined by a corresponding sensor. To this end, the plough implement and/or a corresponding agricultural work vehicle may have a variety of sensors that are suitable for determining one or more of the parameters. For example, the plough implement and/or the associated agricultural work vehicle may include one or more of a wheel height sensor, a speed sensor, a working depth sensor, wheel slip sensors, etc.

The implement-data may be indicative of one or more of:
a speed of the plough implement and/or the associated agricultural work vehicle;
a ploughing resistance experienced by the plough implement and/or the at least one ground engaging tool;
a wheel slip experienced by a wheel of the plough implement and/or the associated agricultural work vehicle.

Of course, the implement-data may be indicative of any other suitable operating parameter of the plough implement that is suitable for determining a desired working depth of the at least one ground engaging tool.

The at least one ground engaging tool may be a plough body and the parameter may be indicative of a furrow depth created by the plough body. In this example, a sensor associated with the plough implement and/or the corresponding agricultural work vehicle may be an image sensor or any other sensor for assessing the furrows created by the plough bodies. If the furrow depth determined by the image sensor is not as desired, a control unit may automatically change the working depth of one or more plough bodies. Of course, it is generally also conceivable to gauge other parameters that are indicative of the quality of the furrows created by the plough bodies, such as the furrow width or weed residues left uncovered. Any of these furrow quality parameters may be fed back to a control unit and used to adjust the working depth of the plough bodies accordingly.

In yet another embodiment, the field-data is indicative of a boundary between a work area and a headland of the field. A GPS sensor may be used to determine the plough implement's location on a map of the field to determine the plough implements distance to a headland of the field. Knowing the speed of the plough implement, a control unit may determine when and how quickly to change the working depth of the at least one ground engaging tool, such that the at least one ground engaging tool is lifted out of the soil accurately at a border between the work area and the headland. If the working depths of the plurality of ground engaging tools of the plough implement are independently adjustable, then the method may be used to create a straight border between the work area and the headland, rather than the more traditional zig-zag pattern often caused by the staggered arrangement of the plough bodies.

According to another embodiment, the method comprises retrieving and/or calculating a desired working depth corresponding to the implement-data determined by means of the sensor.

The method may comprise identifying a current working depth of the at least one ground engaging tool and comparing the current working depth to the desired working depth and adjusting the working depth of the at least one ground engaging tool when a difference between the current and the desired working depth exceeds or falls below a predetermined threshold value. The current working depth may be determined by a corresponding sensor associated with the plough implement and/or a corresponding agricultural work vehicle. Alternatively, the current working depth may be retrieved from a database/memory of that is updated every time the working depth of the ground engaging tool is changed. The threshold value may either be set by the manufacturer or determined by the operator before and/or during the ploughing operation.

In yet another embodiment, the at least one ground engaging tool is a plough body. Alternatively, the at least one ground engaging tool may be a skimmer. In another embodiment, the plurality of ground engaging tools may include both plough bodies and skimmers, wherein the working depth of both the skimmers and the plough bodies may be adjustable by one or more depth adjustment apparatus. Working depth adjustments of the plough bodies and the skimmers may be synchronised, such that—in certain circumstances—the working depths of the skimmers is adjusted following an adjustment of the plough bodies and vice versa. For example, if the working depth of the plough bodies is increased by means of a depth wheel, it may be desirable to lift the corresponding skimmers so as to maintain their working depth. In other words, as the plough bodies are moved further into the soil by lowering the main frame, the skimmers may be lifted with respect to the main frame to compensate for the reduced clearance between the main frame and the ground surface.

According to another embodiment, the plough implement comprises a main frame, which is transferable between a first condition, in which a first ground engaging tool is in a working position, and a second configuration, in which a second ground engaging tool is in a working position, and wherein controlling the operation of the depth adjustment apparatus comprises simultaneously and equally adjusting the working depth of the first and the second ground engaging tool. In other words, the plough implement may be a reversible plough with a first plurality of ground engaging tools on one side of the main frame and a second plurality of ground engaging tools on the second side of the main frame. A first ground engaging tool, such as a plough body on the first side of the main frame, may have a corresponding second ground engaging tool such as a plough body on the opposite side of the main frame. For example, the first ground engaging tool may be arranged to create the first furrow if the reversible plough implement is in its first configuration, whereas the second ground engaging tool may create the first furrow in the second configuration of the plough implement. The method may, therefore, be used to copy the working depth setting of the active ground engaging tool to the corresponding ground engaging tool that is currently inactive on the other side of the main frame. This will simplify the reversal process of the plough implement, because the correct working depth may already be set before the reversal process is started.

There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

In another aspect of the present invention, there is provided a plough implement comprising a plurality of ground engaging tools including at least one ground engaging tool for penetrating and moving soil and a depth adjustment apparatus configured to adjust a working depth of the at least one ground engaging tool. The plough implement further comprises a control unit for receiving control-data indicative of at least one of an operation of the plough implement or a field condition of a field across which the plough implement is being moved, wherein the control unit is configured to automatically control an operation of the depth adjustment apparatus in a manner than adjusts a working depth of the at least one ground engaging tool on the basis of the control-data received.

In another aspect of the present disclosure, there is provided an agricultural machinery comprising an agricultural work vehicle, such as tractor, and any embodiment of the plough implement described above, wherein the plough implement is connected to the front or rear of the agricultural work vehicle.

According to yet another aspect of the present disclosure, there is provided a method for adjusting a working depth of a plough implement, the plough implement comprising a plurality of ground engaging tools for penetrating and moving soil and a depth adjustment apparatus configured to adjust a working depth of at least one of the ground engaging tools, wherein the method comprises:

receiving control-data indicative of two or more field conditions of a field across which the plough implement is being moved; and automatically controlling an operation of the depth adjustment apparatus in a manner that adjusts a working depth of the at least one ground engaging tool on the basis of the control-data received.

In one embodiment, the control-data comprises ground-contour-data that is indicative of ground contours of the field across which the plough implement is being moved and soil-data that is representative of at least one characteristic of the soil of the field.

The soil-data may be representative of at least one characteristic of the soil below a ground surface of the field.

In another embodiment, the soil-data is indicative of one or more of:
a moisture content of the soil;
soil compaction levels of the soil;
a temperature of the soil;
a type of plant residues to be buried;
a soil type; and
an ability of the soil to drain water.

In yet another embodiment, the soil-data and/or the ground-contour-data comprises live-data determined during a working operation of the plough implement.

In another embodiment, the ground-contour-data is indicative of one or more of:
a longitudinal inclination of the plough implement;
a lateral inclination of the plough implement;
an inclination of the ground surface of the field in a direction of travel of the plough implement; and
an inclination of the ground surface of the field laterally to a direction of travel of the plough implement.

According to another embodiment, a plurality of candidate ground-contour-data is stored in a database and automatically controlling the operation of the depth adjustment apparatus includes:

receiving location-data of the plough implement within the field; and using the location-data to select one of the candidate ground-contour-data as the ground-contour-data.

In another embodiment, the control-data comprises implement-data associated with the operation of the plough implement.

In yet another embodiment, the implement-data is indicative of one or more of:
a speed of the plough implement and/or the associated agricultural work vehicle;
a ploughing resistance experienced by the plough implement or the at least one ground engaging tool;
a wheel slip experienced by a wheel of the plough implement and/or the associated agricultural work vehicle;
a lateral distance between adjacent ground engaging tools of the plough implement;
a position of at least one of the ground engaging tools with respect to a ground surface of the field.

According to another embodiment, the plough implement comprises a plurality of depth adjustment apparatus, each depth adjustment apparatus being configured to independently adjust a working depth of at least one of the plurality of ground engaging tools, and wherein automatically controlling an operation of the depth adjustment apparatus comprises controlling an operation of two or more of the depth adjustment apparatus in a manner that changes a working depth of two or more of the plurality of ground engaging tools independently of each other.

The method may further comprise retrieving and/or calculating a desired working depth corresponding to the control-data received.

According to another embodiment, the method comprises identifying a current working depth of the at least one ground engaging tool and comparing the current working depth to the desired working depth and adjusting the working depth of the at least one ground engaging tool when a difference between the current and the desired working depth exceeds or falls below a predetermined threshold value.

The at least one ground engaging tool may be a skimmer.

In another embodiment, the plough implement comprises a main frame, which is transferable between a first configuration, in which a first ground engaging tool is in a working position, and a second configuration, in which a second ground engaging tool is in a working position, and wherein controlling the operation of the depth adjustment apparatus comprises simultaneously and equally adjusting the working depth of the first and the second ground engaging tool.

According to another aspect of the present disclosure, there is provided a plough implement comprising:

a plurality of ground engaging tools including at least one ground engaging tool for penetrating and moving soil and a depth adjustment apparatus configured to adjust a working depth of the at least one ground engaging tool;

a control unit for receiving control-data indicative of two or more field conditions of a field across which the plough implement is being moved;

wherein the control unit is configured to automatically control an operation of the depth adjustment apparatus in a manner that adjusts a working depth of the at least one ground engaging tool on the basis of control-data received by the control unit.

The agricultural work vehicle (or tractor) may include one or more control devices, such as but not limited to programmable or non-programmable processors. Similarly, the plough implement may include one or more control devices, such as but not limited to programmable or non-programmable processors. Additionally or alternatively, the plough implement may be controlled by one or more control devices of the agricultural work vehicle. Similarly, the agricultural work vehicle may be controlled by one or more control devices of the plough implement.

The agricultural work vehicle and/or the plough implement may be remote controlled, e.g. from a farm office. Accordingly, the agricultural work vehicle may include one or more communication interfaces for connection to a remote processor and/or a remote controller. Similarly, the plough implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
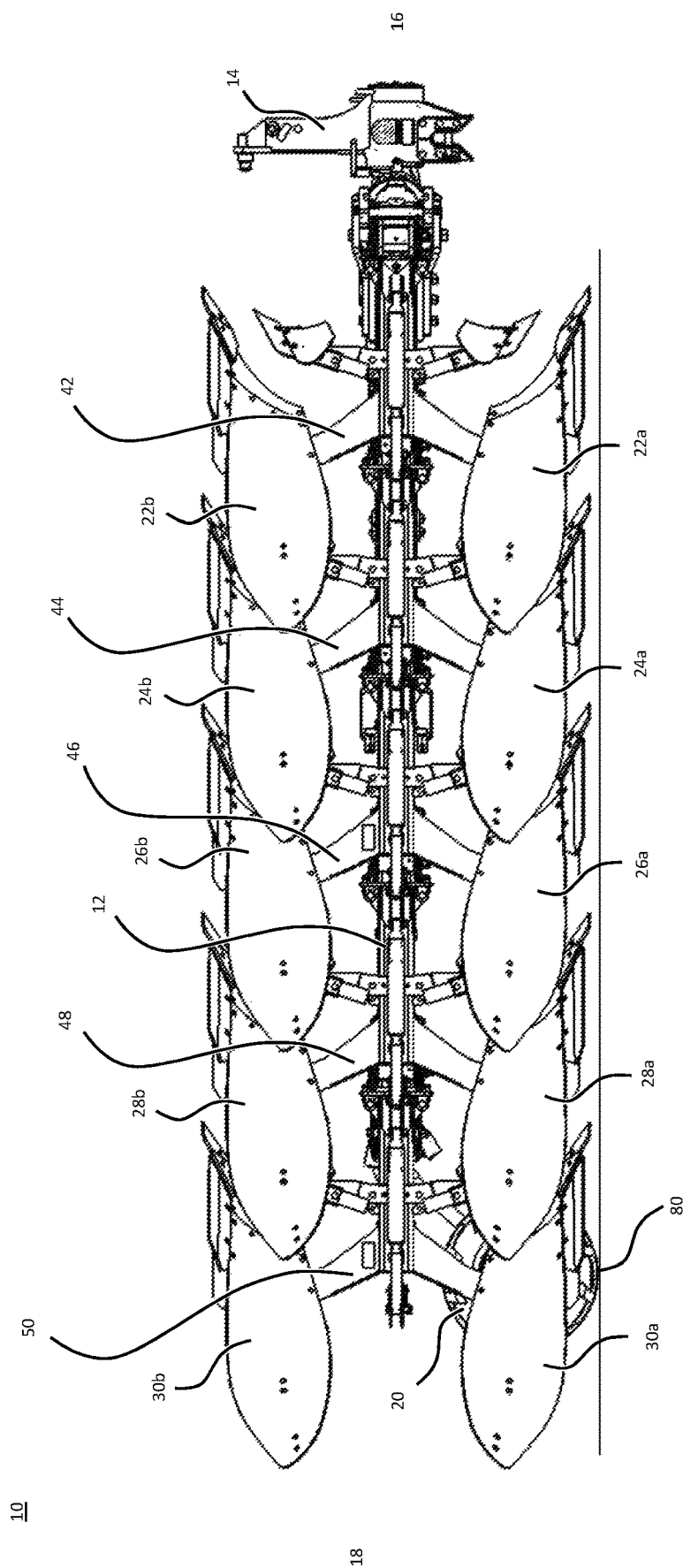
FIG. 1A shows a right-side view of a plough implement with fixed ground engaging tools.
Figure 1B:
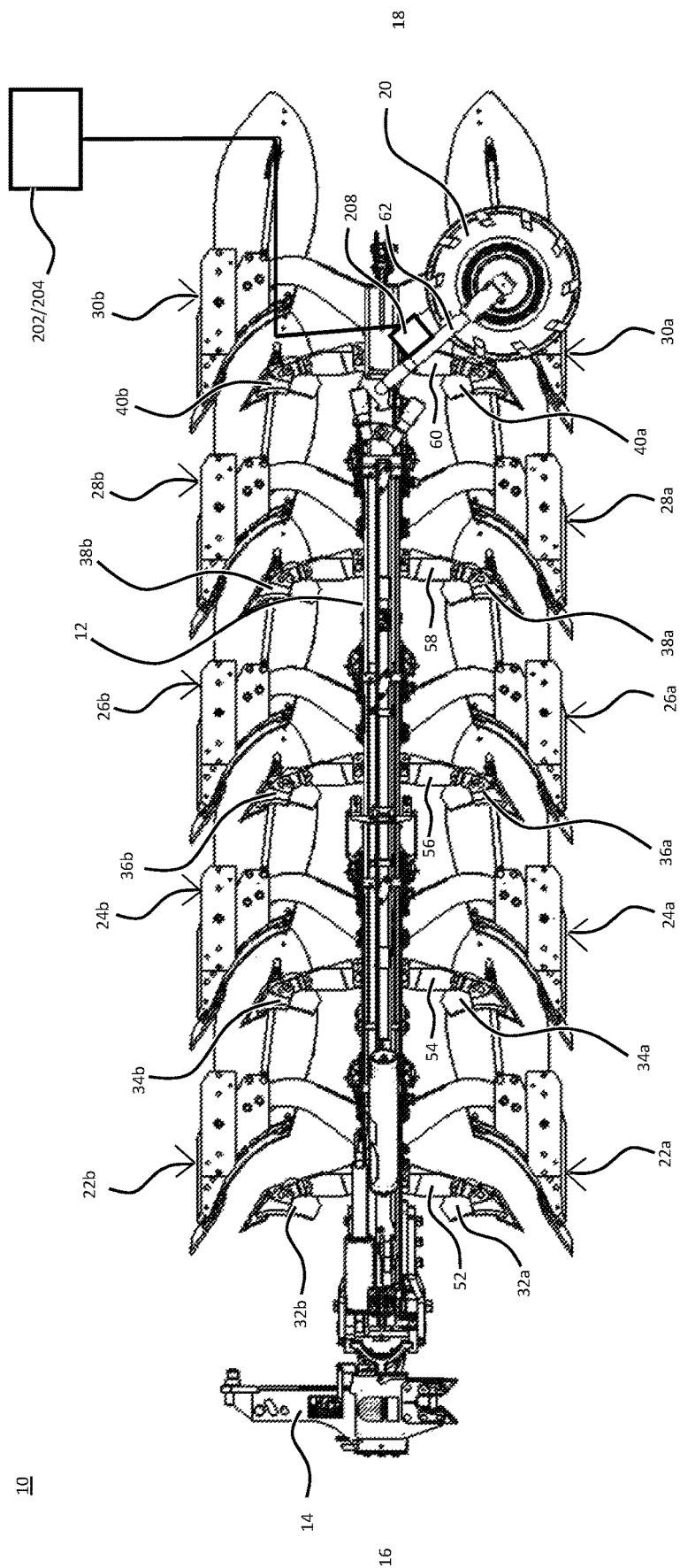
FIG. 1B shows a left-side view of the plough implement shown in FIG. 1A.
Figure 1C:
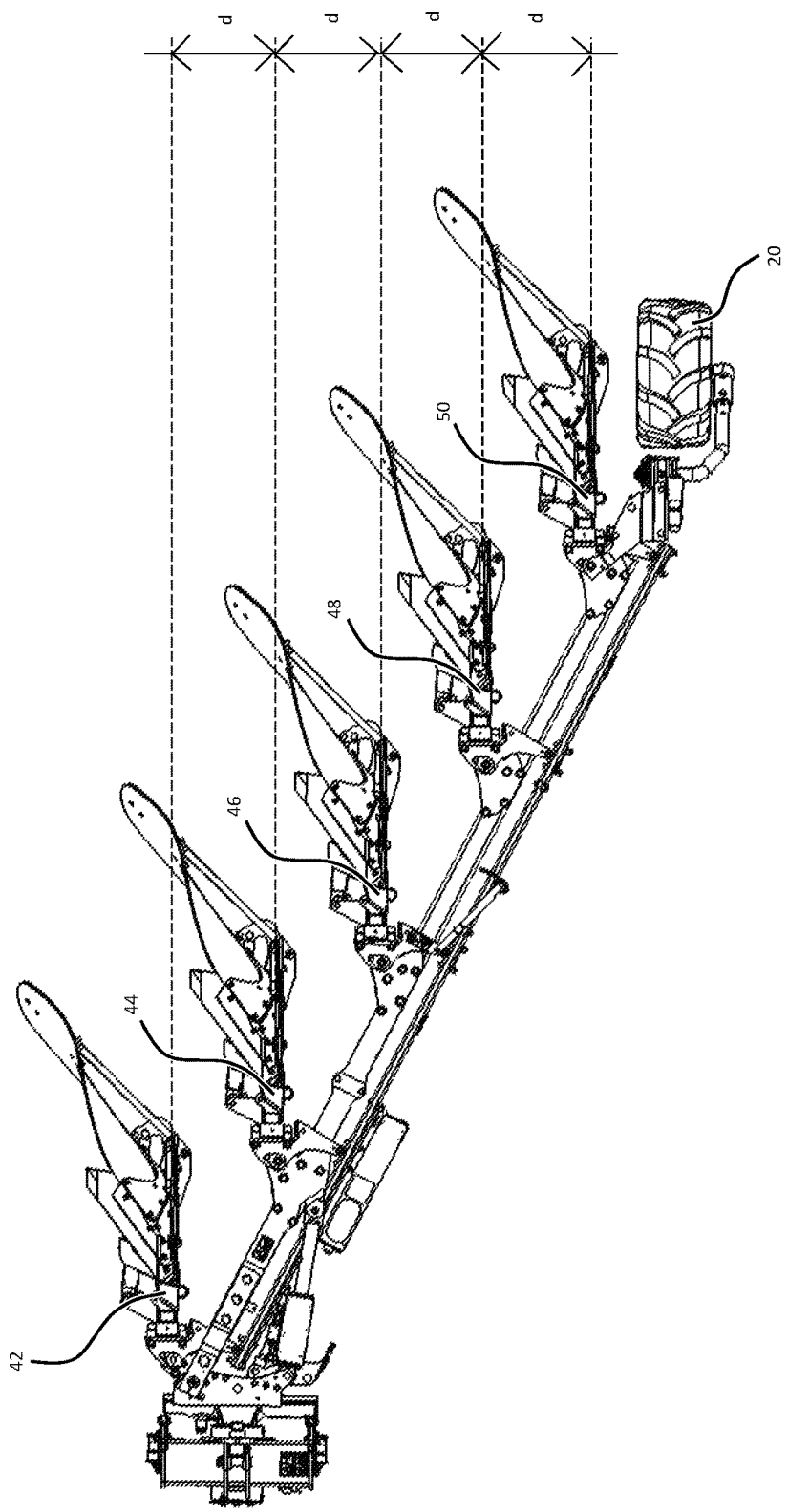
FIG. 1C shows a plan view of the plough implement shown in FIG. 1A.

FIGS. 1A to 1C show various views of a plough implement, particularly a plough implement 10. As will be described in more detail below, the plough implement 10 shown in FIGS. 1A to 1C is a reversible plough.

The plough implement 10 comprises a main frame 12. The main frame 12 may be a rectangular or round tube extending between a headstock 14 at a front end 16 of the plough towards a plough wheel 20 at a rear end 18 of the plough. The main frame 12 supports a variety of ground-engaging tools.

In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 1C, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 1C, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural work vehicle such as a tractor. It follows that each run of the illustrated plough implement 10 through a field creates five adjacent furrows.

A first mounting rail 52 supports a first pair of skimmers 32a, 32b. A second mounting rail 54 supports a second pair of skimmers 34a, 34b. A third mounting rail 56 supports a third pair of skimmers 36a, 36b. A fourth mounting rail 58 supports a fourth pair of skimmers 38a, 38b. A fifth mounting rail 60 supports a fifth pair of skimmers 40a, 40b. The skimmers 32a, 32b, 34a, 34b, 36a, 36b, 38a, 38b, 40a, 40b and/or their respective mounting rails 52, 54, 56, 58, 60 may be adjustable with respect to the main frame 12 to change the distance between the skimmers 32a, 32b, 34a, 34b, 36a, 36b, 38a, 38b, 40a, 40b and the main frame 12. In one example, the skimmers 32a, 32b, 34a, 34b, 36a, 36b, 38a, 38b, 40a, 40b may be movable up and down towards and away from the main frame 12 to individually adjust the working depth of each of skimmers 32a, 32b, 34a, 34b, 36a, 36b, 38a, 38b, 40a, 40b. The skimmers 32a, 32b, 34a, 34b, 36a, 36b, 38a, 38b, 40a, 40b may either be manually or automatically adjustable.

Figure 2:
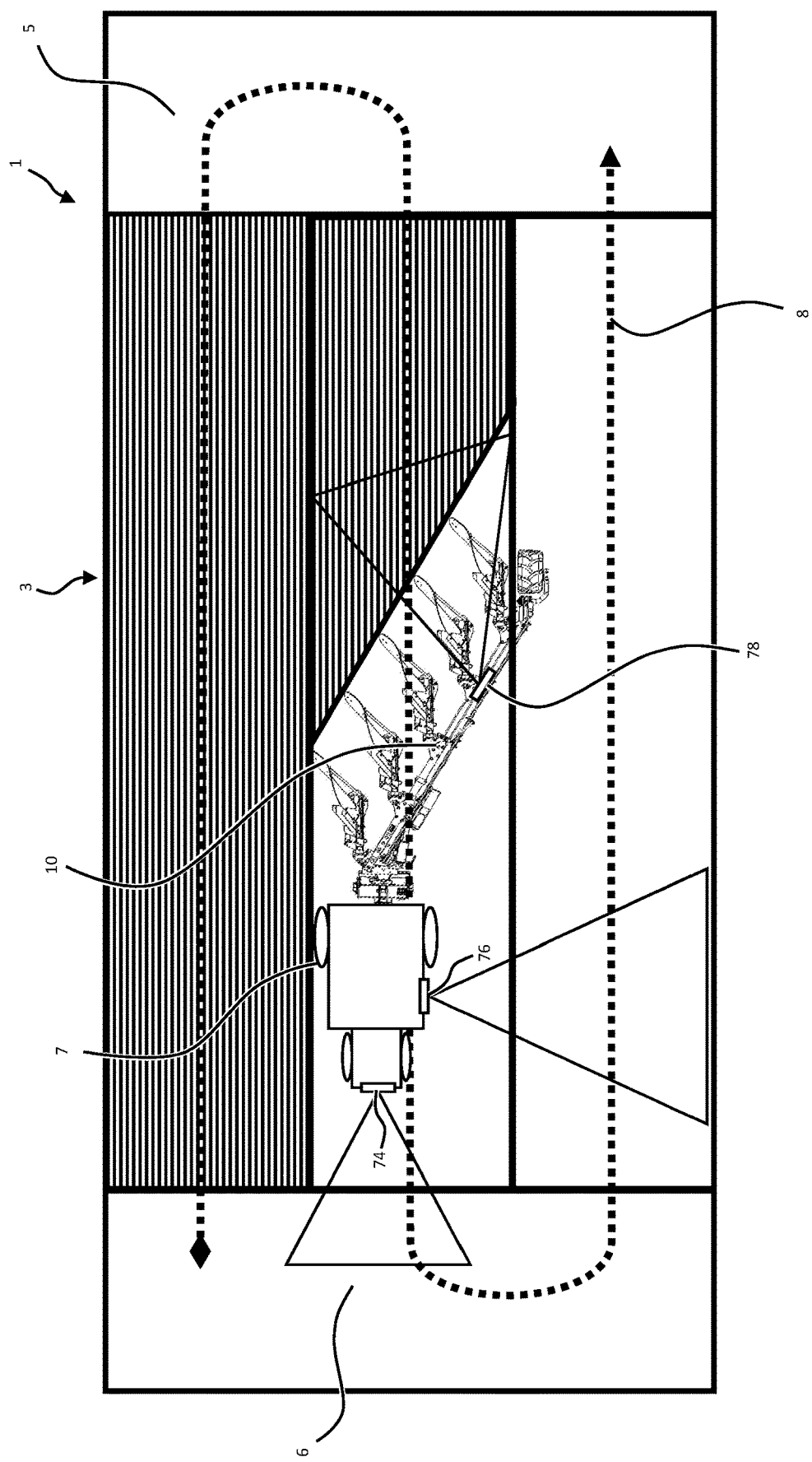
FIG. 2 shows a schematic representation of the trajectory of an agricultural machinery within a work area.

Turning to FIG. 2, a typical operation of an agricultural machinery comprising a tractor 7 and a plough implement 10 is described. In use, the plough implement 10 is drawn as an attachment (implement) behind an agricultural towing vehicle (e.g. tractor 7). It will be appreciated that it is equivalently feasible to locate the plough implement 10 in front of or both in front of and behind the tractor 7.

FIG. 2 shows a schematic work area 1, e.g. a crop field, which is divided into a main field 3 and headlands 5,6. A tractor 7 draws the plough implement 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough implement 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough implement 10 reaches the headlands 5 or 6 respectively. Once the tractor 7 and the corresponding plough implement 10 have turned on the headland 5, 6, the ground engaging tools of the plough implement 10 are, again, lowered towards an operating position to engage the soil of the main field 3.

In the illustration of FIG. 2, the plough implement 10 is working on the main field 3 and, therefore, is arranged in the operating position. As the plough implement 10 reaches the border between the headland 5/6 and the main field 3, the plough implement 10 is transferred to a headland/transfer position. It follows that each working row starts with an adjustment of the plough from the transfer position into the operating position and ends with an adjustment of the plough from the operating position into the transfer position.

The plough implement 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough implement 10 is also reversed. That is, the main frame 12 is rotated by 180 degrees with respect to the headstock 14 to move the plough from a first configuration to a second configuration. In its first configuration shown in FIGS. 1A to 1C, the plough implement 10 is set up such that the plurality of first ground engaging tools, i.e. plough bodies 22a, 24a, 26a, 28a, and 30a and skimmers 32a, 34a, 36a, 38a, 40a, of each of the pairs are in contact with the soil. This first configuration is shown in FIG. 2 and sometimes also referred to as the "left side configuration", since most of the plough bodies are arranged to the left of tractor 7. In its second configuration (not illustrated), the plough implement 10 is set up such that the plurality of second ground engaging tools, i.e. plough bodies 22b, 24b, 26b, 28b, 30b and skimmers 32b, 34b, 36b, 38b, 40b, are in contact with the soil. This second configuration is achieved after rotating the main frame by 180 degrees, such that the majority of plough bodies are then located to the right of the tractor (not shown). The second configuration is, therefore, also sometimes referred to as the "right side configuration".

Tilling the field with the plough implement 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 10.

As the reversible plough implement 10 reaches the end of the first run, the main frame 12 is rotated by 180 degrees (reversed) with respect to the headstock 14. A turning cylinder (not shown), attached to the headstock 14 may be used to rotate (reverse) the plough implement 10. During rotation of the main frame, the first plurality of plough bodies, e.g. 22a, 24a, 26a, 28a, 30a, are transferred to the top of the plough implement 10. At the same time, the second plurality of plough bodies e.g. 22b, 24b, 26b, 28b, 30b, which were not in use in the previous run, is then transferred to the lower end of the plough implement 10 and will be submerged in the soil during the next run. The reversible plough is then in its second configuration (not shown).

Executing a second run of the field with the plough implement 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough implement 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough implement 10 the main frame 12 is supported by an implement wheel 20. The implement wheel 20 is arranged at the back end 18 of the plough implement 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 1C includes implement wheel 20, which acts as a depth wheel to adjust the ground clearance of the main frame 12. A linkage 62 provided between the implement wheel 20 and the main frame 12 allows the operator to lift or lower the main frame 12 with respect to a ground surface 80. The linkage 62 may be connected to an actuator, e.g. a hydraulic cylinder (not shown), for adjusting the distance between the implement wheel 20 and the main frame, thereby lifting and lowering the main frame. The linkage 62 and the actuator together form a depth adjustment apparatus for the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by shortening the linkage 62 between implement wheel 20 and the main frame 12, then the working depth of the plurality of first ground engaging tools shown in FIGS. 1A to 1C is increased, i.e. the plurality of first ground engaging tools are lowered further into/towards the soil. If, on the other hand, the main frame 12 is lifted, by extending the linkage 62 between implement wheel 20 and the main frame 12, then the working depth of the plurality of first ground engaging tools is decreased, i.e. the plurality of first ground engagement tools are either raised or completely pulled out of the soil. It will be appreciated that extending and retracting the linkage 62 will mainly raise or lower the back end of the plough implement 10. In order to evenly raise the front and the back end of the plough implement 10, the headstock 14 may be raised or lowered together with an adjustment of the linkage 62 of the implement wheel 20. Raising or lowering the headstock may be achieved by means of hydraulic cylinders connected to lifting arms of the agricultural work vehicle that carry the headstock 14.

Figure 3:
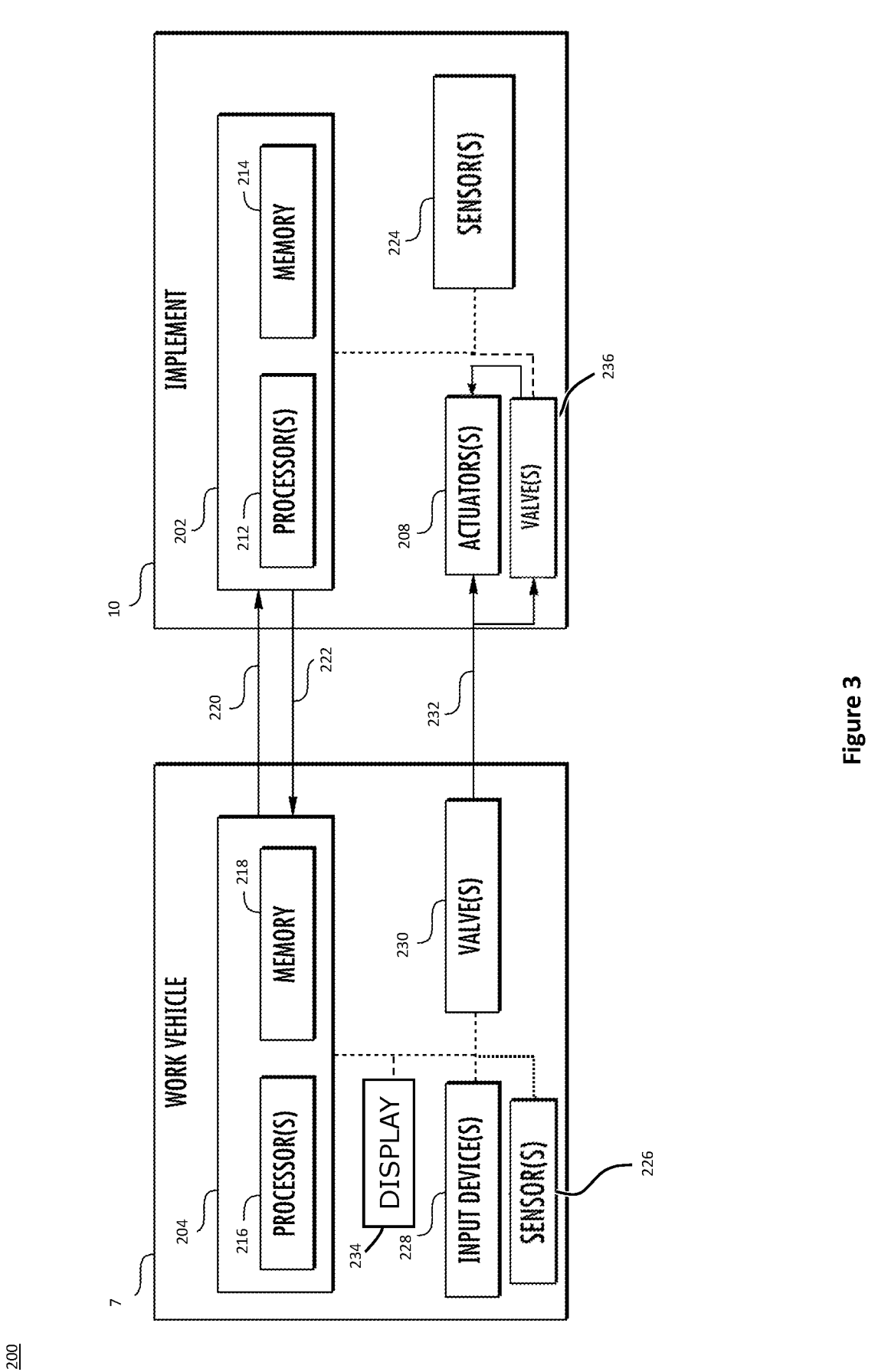
FIG. 3 shows a schematic representation of a system for adjusting the working depth of a plough implement.

Referring to FIG. 3, there is shown a schematic view of an embodiment of a system 200 for adjusting the working depth of a plough implement. The system 200 may include a control unit 202 installed on and/or otherwise provided in connection with the plough implement 10. In some embodiments, the system may additionally or alternatively include a control unit 204 which is associated with the agricultural work vehicle 7, such as a towing vehicle (e.g. a tractor).

Either the control unit 202 associated with the plough implement 10 and/or the control unit 204 associated with the work vehicle 7 may be capable of electronically controlling the operation of one or more components of the plough implement, such as by electronically controlling the operation of one or more ground engaging tools via corresponding actuators 208. Similarly, either the control unit 202 of the implement or the control unit 204 of the agricultural work vehicle 7 may be capable of controlling operation of one or more components of the agricultural work vehicle 7.

The control unit 202 associated with the plough implement 10 may include one or more processors 212 associated with one or more memory devices 214. Similarly, the control unit 204 associated with the agricultural work vehicle 7 may also include one or more processors 216 connected to one or more memory devices 218. The control unit 202 of the plough implement 10 and the control unit 204 of the agricultural work vehicle 7 may communicate with each other as indicated by arrows 220, 222. For example, the control unit 202 of the implement may communicate live field-data and/or implement data detected by implement sensors 224 to control unit 204 of the work vehicle. Similarly, control unit 204 of the agricultural work vehicle 7 may communicate with control unit 202 of the implement via communication line 220 to forward data determined by vehicle sensors 226 or forward direct commands of the operator entered via one or more input devices 228. Control unit 204 of the work vehicle 7 may also be connected to one or more valves 230, such as hydraulic valves. The valves 230 may be part of a hydraulic system (not shown) located on the agricultural work vehicle 7. By controlling valves 230, control unit 204 may control a hydraulic fluid supply from the hydraulic system, either directly or indirectly, towards actuators 208 of the plough implement 10, via fluid lines 232. Similarly, the control unit 202 of the agricultural plough implement 10 may be connected to one or more valves 236 that are attached to the plough implement 10. By controlling valves 236, control unit 202 may further control a hydraulic fluid supply to individual actuators 208 of the plough implement 10. In this case, the control unit 204 of the work vehicle may still be directly connected to the valves or it may be connected to the valves via the control unit 202 of the plough implement 10. Again, it should be appreciated that generally only a single control unit 202 or 204 may be required to control both the plough implement 10 and the agricultural work vehicle 7 together with their corresponding hardware. The control unit may also be located remotely from both the agricultural work vehicle 7 and the plough implement 10.

The one or more actuators 208 may be part of one or more depth adjustment apparatus configured to adjust the working depth of one or more of the ground engaging tools of the plough implement 10. In one example, the one or more actuators 208 may correspond to hydraulic actuators associated with linkage 62 and hydraulic actuators connected lifting arms (not shown) of the agricultural work vehicle for lifting or lowering the headstock 14 described in connection with FIG. 1B. Accordingly, the actuators 208 may be used to change the ground clearance of the main frame of the plough implement 10 depending on an input from either one of control units 202, 204. The control unit(s) 202, 204 may be used to automatically synchronise adjustment of the linkage 62 and the headstock level, such that front and back ends of the plough implement 10 are raised and/or lowered at the same time. Alternatively, and as described in connection with FIG. 7, individual actuators and depth adjustment apparatus may be provided for each of the ground engaging tools.

The control unit 202 of the implement and/or the control unit 204 of the agricultural work vehicle 7 are capable of automatically controlling an operation of a depth adjustment apparatus to adjust a working depth of at least one of the ground engaging tools. In this specification, the term "automatically controlling" refers to the ability of the control units 202 and/or 204 to adjust the working depth of the at least one ground engaging tool independent of an operators' input. Rather, control units 202, 204 are configured to receive control-data indicative of at least one of an operation of the plough implement 10 or a field condition of a field across which the plough implement 10 is being moved. The control-data received by the control unit 202 of the plough implement 10 and/or the control unit 204 of the agricultural work vehicle 7 may be provided by various sources.

In one embodiment, one or more sensors 224 of the plough implement 10 and/or one or more sensors 226 of the work vehicle 7 may be used to determine live implement-data associated with the operation of the plough implement 10 and/or live field-data associated with the field condition of the field across which the plough implement 10 is being moved. To this end, the sensors 224, 226 may include a variety of different sensor types for determining various data associated with the field condition and/or the implement condition.

In one example shown in FIG. 2, the sensors 226 of the agricultural work vehicle 7 include optical sensors 74 and 76. A first optical sensor 74 may be connected to a front end of the work vehicle 7. The first sensor 74 may be used to determine the field conditions ahead of the agricultural work vehicle 7. For example, the first sensor 74 may be able to determine the contours of the field in front of the agricultural work vehicle and, therefore, also in front of the plough implement 10. The first sensor 74 may also be able to determine field-data that is indicative of a boundary between the work area 3 and headlands 5, 6 of the field. The first optical sensor 74 may provide such field-data relating to the field condition in front of the working vehicle 7 to one or both of the control units 202, 204.

A second optical sensor 76 may be arranged on a side of the agricultural work vehicle 7 or, alternatively, on a side of the plough implement 10. The second optical sensor 76 may be used to determine field-data indicative of the field conditions on the next working row. Such field-data may be indicative of the contours of the field on the next working row or obstacles along the next working row (e.g. rocks) that need to be avoided by the ground engaging tools of the plough implement 10.

Of course, optical sensors may also be arranged on the plough implement. One example of an optical sensor arranged on the plough implement 10 is a third sensor 78. In the example FIG. 2, the third sensor 78 is an image sensor viewing the furrows created by the implement plough 10 for quality assessment. In the example shown in FIG. 2, the third sensor 78 is configured to view the furrows directly behind the plough implement 10. However, it is also feasible to provide an alternative or additional optical sensor that determines the quality of the furrows in a previous working row, e.g. adjacent to the working row the plough is currently working on. Field-data that are determined by the third sensor 78 may include the furrow depth and the furrow width created by the plough bodies of the plough implement 10. Other field-data determined by the third sensor 78 and provided to one or both of the control units 202, 204 may be indicative of the amount of weed residues that were not covered by the ploughing operation, or the homogeneity of the furrows created by the plough implement 10. In other words, the third sensor 78 may be an optical sensor configured to recognise weed or other plant residues left on the ploughed soil, e.g. by means of their colour.

Of course, sensors 74, 76 and 78 are only a few examples of sensors that may be used to determine live field-data that are fed back to one or both of the control units 202, 204. Other sensors may include:

humidity sensors for determining a humidity parameter indicative of the moisture content of the soil;

resistance sensors for determining parameters indicative of soil compaction levels of the soil;

temperature sensors for determining the temperature of the soil;

level sensors for determining the parameters indicative of the contours of the field.

Such contours of the field may be determined as ground-contour-data. A non-exhaustive list of live ground-contour-data includes:

a longitudinal inclination of the plough implement that may be determined by means of level sensors on the main frame of the plough implement;

a lateral inclination of the plough implement that may be determined by means of level sensors on the main frame of the plough implement;

Most of the above sensors may either be attached to the agricultural work vehicle 7 or the plough implement 10 or even part of a separate device, such as a different agricultural work vehicle or a drone scanning the work area in front of or behind the agricultural work vehicle 7 and the plough implement 10.

Further examples include sensors that determine parameters indicative of the operation of the plough implement such as:

a location sensor for continuously or periodically determining the position of the plough implement 10 within the field, a parameter which may be used to determine the speed of the plough implement 10 and/or the associated agricultural work vehicle 7;

a speed sensor directly determining the speed of the plough implement 10 and/or the associated agricultural work vehicle 7;

a force sensor to determine a drag/resistance experienced by the plough implement 10 or the at least one ground engaging tool;

a wheel slip sensor for determining a parameter indicative of the wheel slip experienced by a wheel 20 of the plough implement 10 and/or a wheel of the associated agricultural work vehicle 7;

a distance sensor for determining a position of at least one of the ground engaging tools (i.e. plough bodies 22a, 24a, 26a, 28a, 30a and/or skimmers 32a, 34a, 36a, 38a, and 40a) with respect to a ground surface of the field. The distance sensor(s) may for example be attached to the beam(s) supporting the plough bodies and configured to measure a distance between a part of the beam and the ground surface. On the basis of said distance, the working depth of the one or more plough bodies may be determined. Similarly distance sensors may be arranged on a support rail of the skimmers.

Each of the sensors described hereinbefore may be directly or indirectly connected to one or both of the control units 202 and 204 associated with the plough implement 10 and/or the work vehicle 7. The sensors supply the control units 202, 204 with control-data including the live field-data and implement data discussed above.

On the basis of the control-data provided with the sensors, the control units 202, 204 may retrieve or calculate a desired working depth. To this end, the respective memories 214, 218 of control units 202, 204 may include a look-up table with an array of working depths linked to different data that may be received from the sensors 224, 226 described above. Alternatively, the memories 214, 218 may include a predetermined algorithm for calculating a desired working depth on the basis of the sensor data. Such predetermined algorithms may then be applied to the parameters of the sensor data by the respective processors 212, 216. Non-exclusive examples of data received by the sensors and a corresponding change in the desired working depth are set out below:

Increasing the working depth if the sensor data indicates a high moisture content of the soil and/or decreasing the working depth if the sensor parameters indicate a low moisture level content of the soil;

Increasing the working depth if the sensor data indicate high soil compaction levels, and/or decreasing the working depth if the sensor parameters indicate low soil compaction levels;

Increasing or decreasing the working depth if the sensor data indicate that the temperature of the soil differs from a desired soil temperature more than a soil-temperature-threshold;

Increasing the working depth if the sensor data indicates that the upcoming contour of the field includes troughs or holes in front of the ground engaging tool in question, and/or decreasing the working depth if the sensor data indicates that the contour of the field includes bumps or ridges in front of the ground engaging tool in question. Examples of sensor that may be suitable for identifying throughs and ridges may be ground radars, optical sensors, level sensors, and/or sensors linked to the suspension of the agricultural work vehicle;

Increasing the working depth if the sensor data indicate that a speed of the plough implement, and/or the associated agricultural work vehicle is above a speed-threshold, and/or decreasing the working depth if the sensor data indicate that a speed of the plough implement or the associated agricultural work vehicle is below a predetermined speed-threshold. In this way, lower working depths can be used at low speeds, for example when the ploughing process is starting to reduce drag and therefore the load on the work vehicle engine. Similarly, when the work vehicle and the plough implement have reached a certain speed, the working depth may be increased without significantly effecting the drag and the corresponding load on the engine of the work vehicle;

Decreasing the working depth if the sensor data indicates that a ploughing resistance experienced by the plough implement or the at least one ground engaging tool is higher than a resistance-threshold, and/or increasing the working depth if the sensor data indicates a ploughing resistance experienced by the plough implement or the at least one ground engaging tool is below a second resistance-threshold;

Decreasing the working depth if the sensor data indicates that a wheel slip experienced by a wheel of the plough implement and/or the associated agricultural work vehicle exceeds a wheel-slip-threshold, and/or increasing the working depth if wheel slip experienced by a wheel of the plough implement and/or the associated agricultural work vehicle is below a wheel-slip-threshold;

Increasing the working depth if the sensor data indicates that a furrow depth created by the respective plough body is too shallow, and/or decreasing the working depth if the sensor data indicate that the furrow depth of the respective plough body is too deep;

Gradually decreasing the working depth if the sensor data indicates that a headland will be encountered within a predetermined distance, and/or increasing the working depth gradually if the sensor data indicates that the plough implement approaches a boundary between the headland and the work area.

It will be appreciated that the change in working depth may be based on one or more of the sensor data discussed above. Some of the sensor data may have priority, such as any upcoming boundary between the work area and the headlands, in which case the control unit 202, 204 will force a respective increase or decrease in the working depth to create a straight border strip, irrespective of other data, such as the soil moisture content or compaction levels of the field.

The work vehicle 7 of system 200 shown in FIG. 3 may also include a display 234 to provide feedback to the operator. The display 234 may be used to illustrate the current working depth of each of the ground engaging tools of the plough implement 10. According to other embodiments, the control units 202, 204 may also display intended working depth changes during the ploughing operation on display 234. The operator may have the option to override any intended change of the working depth via input devices 228. Yet, it will be appreciated that the operator's input is generally not required for the system 200 to change the working depth of one or more of the ground engaging tools of the plough implement 10.

In another embodiment, the control-data received by the control units 202, 204 is not based on live data regarding the field condition and/or the implement operation. Rather, the control-data received by the control unit 202, 204 may be based on predetermined prior field-data stored in a database of memory 214, 218. In this embodiment, the only live data required is location data received by either sensors 224 of the plough implement 10 or sensors 226 of work vehicle 7. The sensors providing location data may be GPS sensors to track the live location of the agricultural work vehicle 7 and/or the plough implement 10 within the field. In this embodiment, the database may include information about the field and a desired working depth at specific locations within the field. For example, the database may include prior field-data associated with previously identified field conditions. The previously identified field conditions may be moisture content of the soil, soil compaction levels, contours of the field, etc. determined prior to the ploughing operation to be controlled. For example, data collected when previously ploughing the field may be reused to determine the desired working depth in different parts of the field. Alternatively, the prior field-data may be data collected by independent data collection devices, such as other agricultural work vehicles/implements or drones used specifically for measuring field-data in advance of the ploughing operation. Moreover, the prior field-data could be based on satellite images taken of the field prior to the ploughing operation. For example, satellite images may be useful in determining field-data indicative of contours of the field and/or the moisture content of the soil.

In some embodiments, the prior field-data includes ground-contour-data. The ground-contour-data may be representative of an inclination of the ground surface of the field in a direction of travel of the plough implement and/or of an inclination of the ground surface of the field laterally to the direction of travel of the plough implement. A control unit may be configured to determine or receive a preferred trajectory of the plough and utilise the ground-contour-data to determine longitudinal and/or lateral inclinations of the field along said trajectory.

As the plough implement is moved across the field, the control units 202, 204 determine the location of the plough implement within the field, for example by means of GPS sensors. The control units 202, 204 may then use this location data to match the current location of the plough implement 10 with a data entry within the memory 214, 218 that is linked to specific prior field-data associated with this particular location within the field. This so identified relevant prior field-data may then be used by the processors 212, 216 of the control units 202, 204 to calculate a desired working depth for the ground engaging tool. Alternatively, another database may be provided that allows the control unit 202, 204 to look up a desired working depth corresponding to the relevant prior field-data determined for the current location of the plough implement 10.

Figure 4:
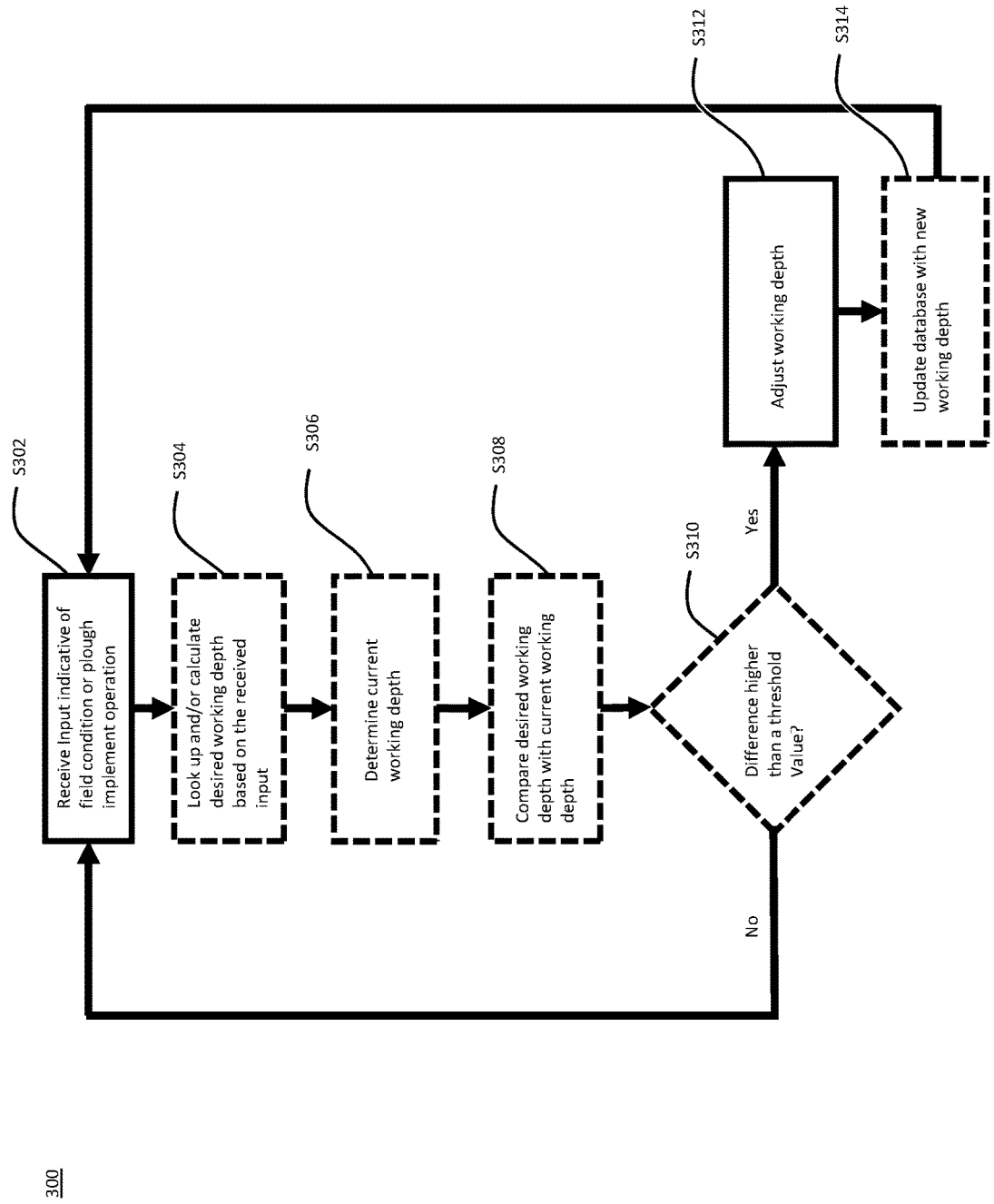
FIG. 4 shows a flow diagram for a method of adjusting the working depth of a plough implement according to an embodiment of the present disclosure.

Turning to FIG. 4, there is shown a flow diagram of a method 300 for adjusting the working depth of a plough implement according to an embodiment of the present disclosure. In this embodiment, the control unit will receive control-data from a sensor that is either connected to or associated with the plough implement 10 and/or the agricultural work vehicle 7.

In more detail, in a first step S302 the control unit receives control-data indicative of an operation of the plough implement and/or field conditions of a field across which the plough implement is being moved. In the method 300 illustrated in FIG. 4, the control-data is received from a sensor that determines one or more live data associated with either the field condition (field-data) and/or the operation of the plough implement 10 (implement data). In one embodiment, described above with respect to FIG. 2, an optical sensor 74 may be provided to determine parameters indicative of the field contours ahead of the agricultural work vehicle 7. This field contour parameter is fed back by the sensor to a control unit that is associated with either the agricultural work vehicle 7 or the plough implement 10. The control unit may use the sensor data to identify troughs and ridges in the field.

Based on the information received by the control unit S302, the control unit may optionally look up and/or calculate a desired working depth in a step S304.

In another optional step S306, the control unit may determine the current working depth. As discussed above, this may either be done by further sensors, such as sensors determining the position of hydraulic actuators of the depth adjustment apparatus, or retrieved from a database within the memory of the control unit.

In a further optional step S308, the control unit may compare the desired working depth with the determined current working depth. In an optional step S310, the control unit compares the difference between the desired working depth and the current working depth with a predetermined threshold value. The threshold value may be set by the manufacturer or by the operator before or during the ploughing operation. If in step S310, the difference between the desired working depth and the current working depth is determined to be higher than the threshold value, then method 300 may move on to step S312. Otherwise, if the difference between the desired working depth and the current working depth is lower than the threshold value, the method 300 is restarted with step S302 outlined above.

In a step S312, the working depth of the at least one ground engaging tool is adjusted by means of the depth adjustment apparatus controlled by the control unit. It should be noted that steps S304 to S310 are optional steps that will improve the accuracy of the working depth adjustment. However, it is also feasible to remove steps S304 to S310 and perform a depth adjustment per step S312 directly in response to control-data received in step S302. For example, if the sensor data is indicative of the field contours and the control unit subsequently determines the presence of a trough in the field, the control unit may directly increase the working depth in step S312, without consideration of the exact working depth desired or the current working depth. In another embodiment, if the sensor data is indicative of the field contours and the control unit subsequently determines the presence of a trough in the field, the control unit may determine a desired increase in working depth and ignore the current working depth.

A further optional step S314 for updating the database with a new working depth may follow step S312. In step S314, the control unit may determine the working depth of the at least one ground engaging tool after the adjustment in step S312 and save this value in the database of the control unit's memory as a new "current working depth". In this way, the database entries of the current working depth are continuously updated as the working depth is adjusted with the depth adjustment apparatus.

Once the database has been updated with the new working depth, the method 300 may be restarted at step S302 for receiving control-data indicative of the field condition and/or the plough implement operation.

Figure 5:
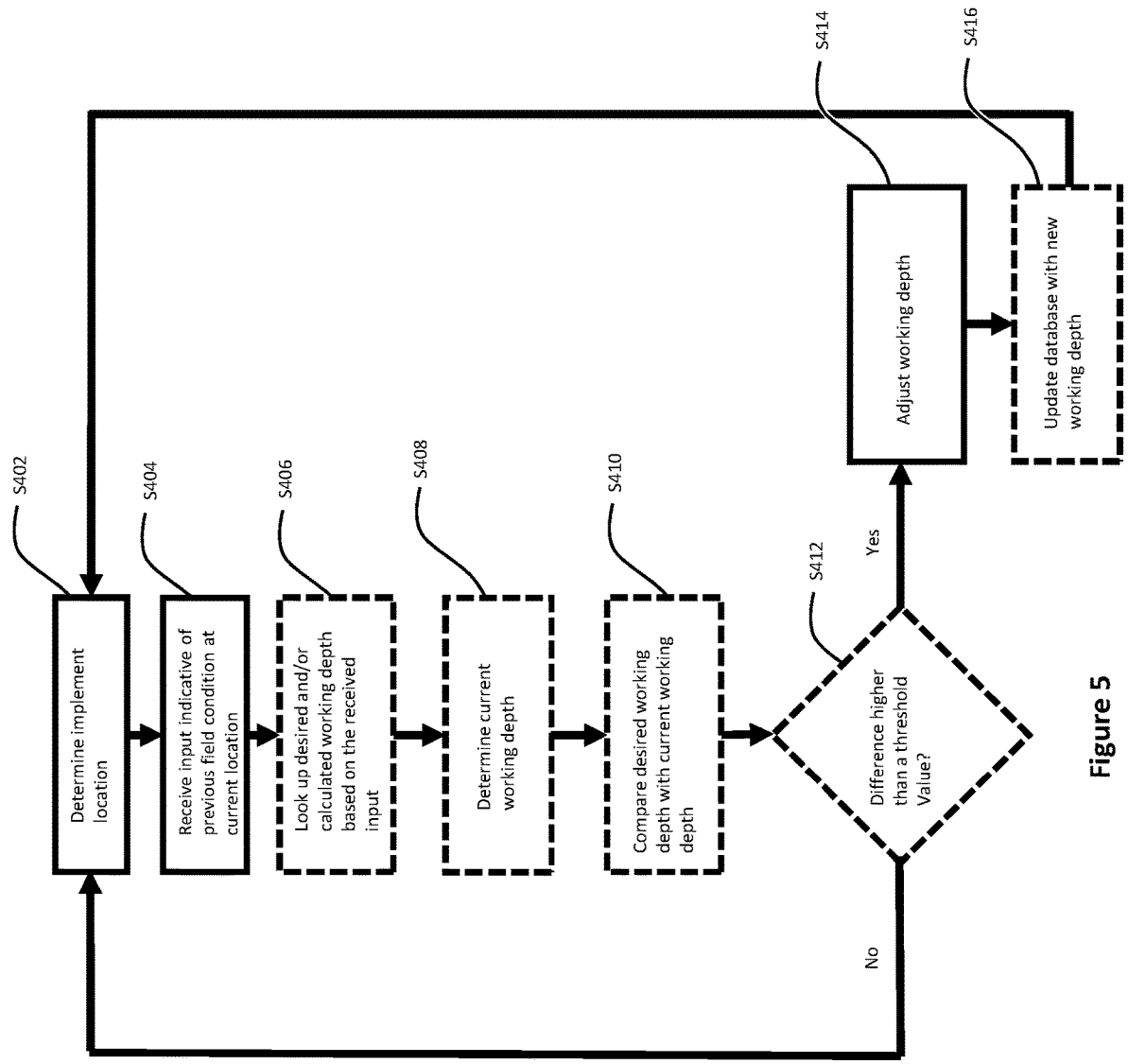
FIG. 5 shows a flow diagram for a method of adjusting the working depth of a plough implement according to an embodiment of the present disclosure.

Turning to FIG. 5 there is shown an alternative embodiment of the method for adjusting the working depth of a plough implement according to the present disclosure. Method 400 differs from method 300 mainly in that the control unit does not receive control-data indicative of live field conditions of the field across which the plough implement is being moved. Rather, decisions on the working depth of the at least one ground engaging tool are made based on existing field-data stored in a database accessible by the control unit.

In more detail, method 400 starts at step S402, in which the location of the plough implement and/or the associated work vehicle 7 is determined. Determination of the location may either be achieved by a location sensor, such as a GPS or provided by the operator, for example by dropping a pin on a map on the display of the agricultural work vehicle 7.

Once the location of the plough implement 10 has been determined in step S402, the control unit will receive control-data indicative of previous field conditions in a step S404. In other words, the control unit will access a database including prior field-data associated with field conditions that were determined before the ploughing operation. In one example, this prior field-data may relate to field conditions determined during previous runs of the same field. Alternatively, the prior field-data may have been taken from satellite images as discussed above. For example, the prior field-data received as control-data by the control unit may be indicative of the moisture content of the soil at any point of the field. The control unit may only retrieve the moisture content of the soil in the current location of the plough implement, i.e. relevant prior field-data that is linked to the plough implement's location.

Based on the prior field-data received by the control unit in step S404, an optional step S406 may follow, in which the desired working depth is looked up and/or calculated by the control unit based on the received relevant prior field-data. Optional steps S408 to S412 may follow to determine the current working depth and comparing the desired and current working depth with a predetermined threshold value.

Steps S408 to S412 are substantially identical to steps S306 to S310 described with reference to method 300 in FIG. 4.

In a further step S414, the control unit actuates the depth adjustment apparatus to adjust the working depth of the at least one ground engaging tool based on the prior field-data input received. Step S414 is substantially identical to step S312 of FIG. 4.

As a last, optional step S416, the database may be updated with the current working depth as the new current working depth within the database. Step S416 is substantially identical to step S314 of FIG. 4. Once the database is updated step S416, the method may return to step S402.

Figure 6:
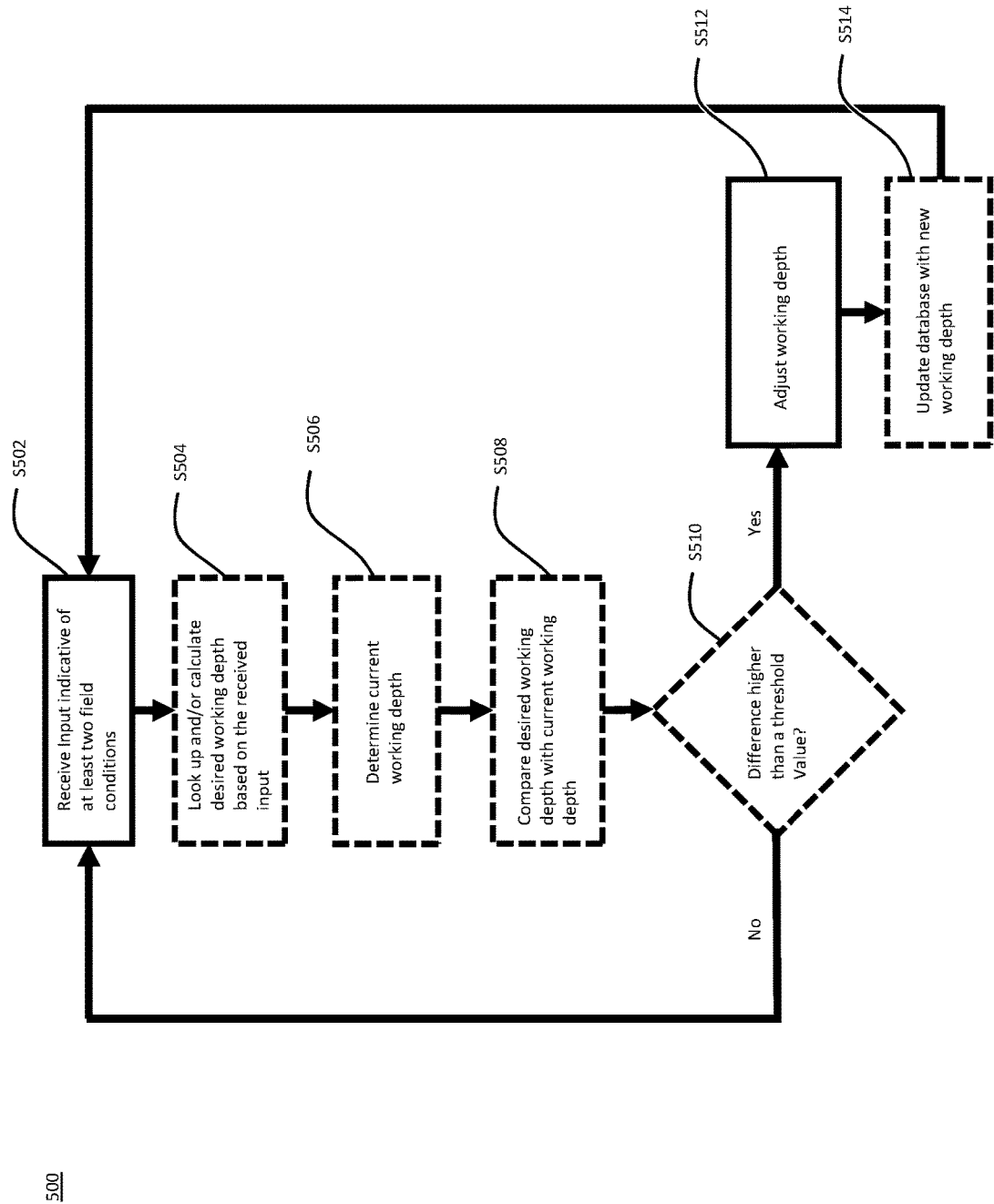
FIG. 6 shows a flow diagram for a method of adjusting the working depth of a plough implement according to an embodiment of the present disclosure.

Turning to FIG. 6 there is shown another alternative embodiment of the method for adjusting the working depth of a plough implement according to the present disclosure. Method 500 may be understood as a variant of method 300 in which more than one kind of control-data is considered when adjusting the working depth of the ground engaging tools.

In more detail, in a first step S502 the control unit receives control-data indicative of at least two field conditions of a field across which the plough implement is being moved. Such control-data may be received as live or prior field-data discussed above. In one example, the control-data comprises ground-contour-data that is indicative of ground contours of the field across which the plough implement is being moved and soil-data that is representative of at least one characteristic of the soil of the field.

The ground-contour-data may be representative of an inclination of the ground surface of the field in a direction of travel of the plough implement and/or of an inclination of the ground surface of the field laterally to the direction of travel of the plough implement. The soil-data may be representative of at least one characteristic of the soil below a ground surface of the field, such as the moisture content of the soil at the current location of the plough implement.

Based on the information received by the control unit S502, the control unit may optionally look up and/or calculate a desired working depth in a step S504. In one example, the desired working depth may be determined on the basis of the soil-data. For instance, the desired working depth may reduce with increasing soil density. Similar, the desired working depth may be deeper in soils with higher moisture content. The control unit may compare the parameters of the soil-data with reference soil characteristics and adjust a predetermined, default working depth on the basis of a difference between the reference soil characteristics and the parameters of the soil-data.

In another optional step S506, the control unit may determine the current working depth. As discussed above, this may either be done by further sensors, such as sensors determining the position of hydraulic actuators of the depth adjustment apparatus, or retrieved from a database within the memory of the control unit. The current working depth may also be affected by the contours of the field. In particular, troughs and ridges within the trajectory of the plough implement may cause temporary changes in the current working depth of one or more ground engaging tools. For example, if the plough implement navigates a small trough, some parts of the main frame of the plough implement may be distanced further from the ground surface than others. This may cause the working depth of some of the ground engaging tools to be reduced or, in some cases, some of the ground engaging tools to be removed from the soil altogether. In order to avoid such inadvertent changes in the working depth of one or more ground engaging tools, the control unit may be configured to determine the current working depth on the basis of ground-contour-data. In one example, the control unit may receive ground-contour-data in the form of longitudinal and lateral inclinations of the filed along the plough's trajectory. This ground-contour-data may be provided to the control unit as prior field-data discussed above. On the basis of such ground-contour-data the control unit may predict inadvertent changes of the current working depth of one or more of the ground engaging tools and take remedial action as required (cf. below).

In a further optional step S508, the control unit may compare the desired working depth with the determined current working depth. In an optional step S510, the control unit may compare the difference between the desired working depth and the current working depth with a predetermined threshold value. The threshold value may be set by the manufacturer or by the operator before or during the ploughing operation. If in step S510, the difference between the desired working depth and the current working depth is determined to be higher than the threshold value, then method 500 may move on to step S512. Otherwise, if the difference between the desired working depth and the current working depth is lower than the threshold value, the method 500 may be restarted with step S502 outlined above.

In a step S512, the working depth of the at least one ground engaging tool is adjusted by means of the depth adjustment apparatus controlled by the control unit. It should be noted that steps S504 to S510 are optional steps that will improve the accuracy of the working depth adjustment. However, it is also feasible to remove steps S504 to S510 and perform a depth adjustment per step S512 directly in response to control-data received in step S502.

A further optional step S514 for updating the database with a new working depth may follow step S512. In step S514, the control unit may determine the working depth of the at least one ground engaging tool after the adjustment in step S512 and save this value in the database of the control unit's memory as a new "current working depth". In this way, the database entries of the current working depth are continuously updated as the working depth is adjusted with the depth adjustment apparatus.

Once the database has been updated with the new working depth, the method 500 may be restarted at step S502.

It will be appreciated that in the methods illustrated in FIGS. 4, 5, and 6, the steps may be carried out for one or more ground engaging tools that may either be adjusted together or individually. Moreover, the methods 300, 400, and 500 may be used to adjust the working depth of various different ground engaging tools, such as plough bodies and/or skimmers that may either be rigidly or movably connected to the main frame of the plough implement 10. In one embodiment, an adjustment of the working depth of one kind of ground engaging tool, such as the plough bodies, will trigger a corresponding adjustment of another kind of ground engaging tool, such as the skimmers. For example, as the working depth of the plough bodies is increased by the method described above, the working depth of the skimmers may simultaneously be decreased to maintain a constant penetration depth of the skimmers, e.g. five centimetres below the ground surface.

Figure 7:
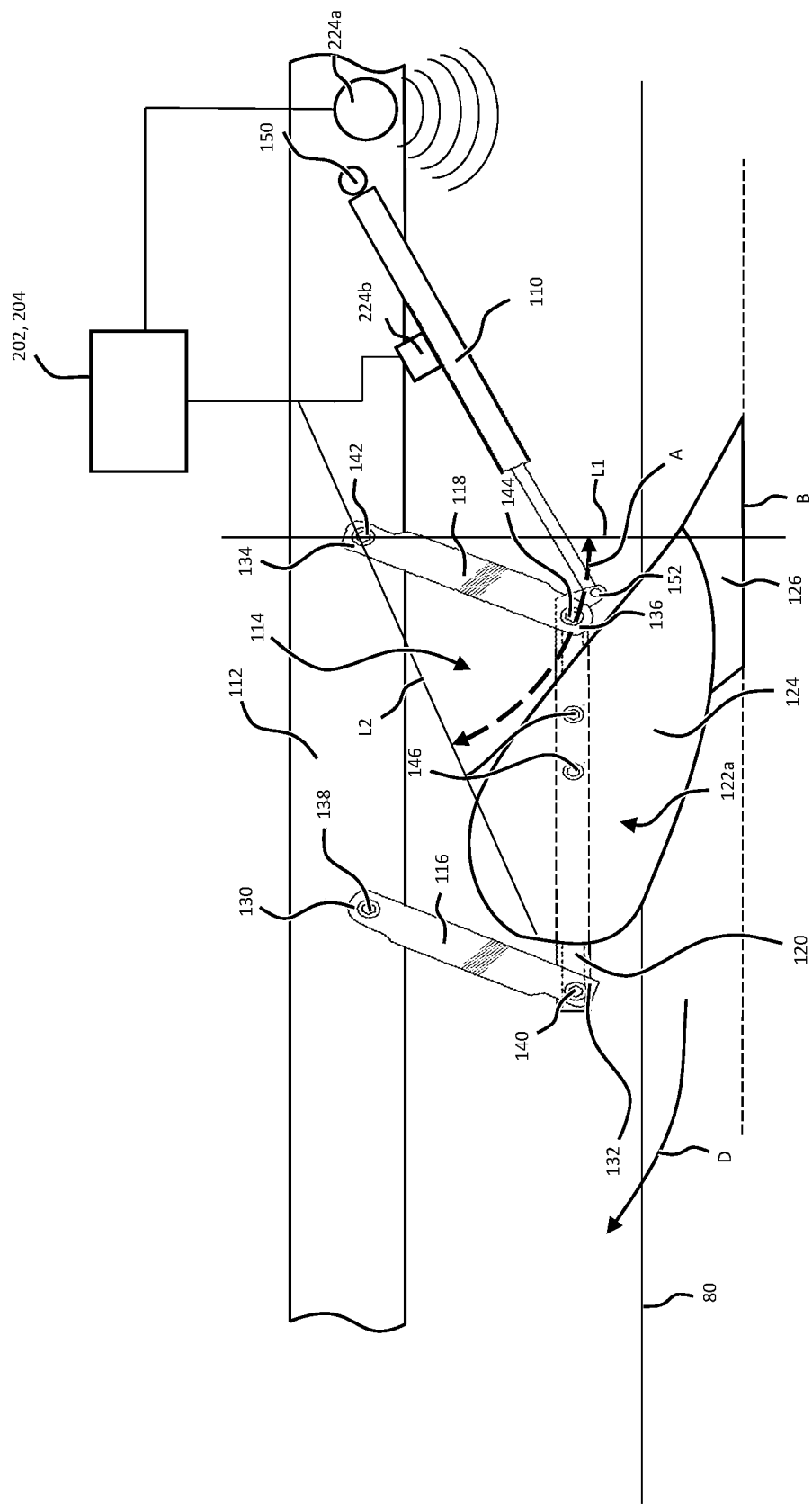
FIG. 7 shows a schematic representation of a ground engaging tool connected to the main frame of a plough implement via a four-bar-linkage.

Turning to FIG. 7, there is shown an alternative way of changing the working depth of the ground engaging tools, using an alternative depth adjustment apparatus. FIG. 7 is a schematic representation of the connection between a main frame 112 and a first ground engaging tool 122a, e.g. a plough body. It should be understood that the plough implement of the present disclosure may have a plurality of first ground engaging tools and a plurality of second ground engaging tools similar to plough implement 10 shown in FIGS. 1A to 1C. FIG. 7 only shows the connection between the main frame 112 and one of the plurality of first ground engaging tools. The first ground engaging tool 122a is a plough body but could also be any other suitable ground engaging tool, such as a skimmer. The plough comprises a mould board 124 and a share 126. The first ground engaging tool 122a is connected to the main frame 112 via a four-bar-linkage 114. The four-bar-linkage 114 is a parallelogram linkage. The four-bar-linkage 114 includes a base, which is represented by the main frame 112, a first pivotable link 116, a second pivotable link 118, and a coupler link 120. The first pivotable link 116 is pivotably connected to the main frame 112 at a first end 130 and pivotably connected to the coupler link 120 at an opposite, second end 132. The second pivotable link is connected to the main frame at a first end 134 and connected to the coupler link 120 at an opposite, second end 136.

The first pivotable link 116 is connected to the main frame 112 at its first end 130 via pivot 138. At its opposite, second end 132 the first pivotable link 116 is connected to the coupler link 120 via pivot 140. The second pivotable link 118 is connected to the main frame at its first end 134 via pivot 142. At its opposite, second end 136, the second pivotable link 118 is connected to the coupler link 120 via pivot 144.

Pivotable bars 116 and 118 are identical in length, i.e. the distance between pivots 138 and 140 of the first pivotable link 116 is identical to the distance between pivots 142 and 140 of the second pivotable link 118.

The distance between the first pivot 138 of the first pivotable link 116 and the first pivot 142 of the second pivotable link 118 is identical to the distance between the second pivot 140 of the first pivotable link 116 and the second pivot 144 of the second pivotable link 118. The first and second pivotable bars 116, 118 are arranged in parallel to each other. The coupler link 120 and the base (represented by part of the main frame 112 between pivots 138 and 142) are arranged in parallel.

The first ground engaging tool 122a (plough body) is connected to the coupler link 120. In this example, the first ground engaging tool 122a may be removably connected to the coupler link 120 via fastening members 146. Of course, any other fastening method may also be feasible to connect the first ground engaging tool 122a to the coupler link 120.

It will be understood that whenever the four-bar-linkage 114 is moved, the first and second pivotable bars 116, 118 remain parallel. Similarly, the coupler link 120 will always remain parallel to the base bar, i.e. to the main frame 112, during movement. A range of movement is schematically shown in FIG. 7 with arrow A. Arrow A shows the possible trajectory of the second pivot 144 during movement of the four-bar-linkage 114. Of course, the second pivot 140 of the first pivotable link 116 has a corresponding range of movement. The pivot 144 may move between a first end position indicated by line L1 and a second end position indicated by line L2. As pivot 144 moves between its first end position and second end position along arrow A, so does pivot 140 of the first pivotable link 116. Consequently, coupler link 120 will undergo the same motion. It follows that in the first end position of second pivotable 118 indicated by line L1, coupler link 120 is at its lowest point, i.e. at a maximum distance from main frame 112. In the second end position of the second pivotable link 118, the coupler link 120 is at its top end, i.e. closest to main frame 112. Accordingly, the working depth of the ground engaging tool 122a, which is connected to coupler link 120, changes as the first and second pivotable bars 116, 118 pivot about their respective first pivots 138, 142. Accordingly, the first ground engaging tool 122a also moves between a first position, in which a maximum working depth is set, i.e. when the second pivotable link 118 is aligned with line L1, and a second position, in which a minimum working depth is set, i.e. when the second pivotable link 118 is aligned with line L2.

It follows that the working depth of the first ground engaging tool 122a shown in the embodiment of FIG. 7 is individually adjustable, irrespective of the ground clearance of the main frame 112. Accordingly, the distance between the implement wheel and the main frame may be fixed, such that the ground clearance of the main frame 112 remains stable.

Of course, other ground engaging tools may be connected to the main frame in similar ways as the first ground engaging tool 122a.

An actuator 110 is provided to move the four-bar-linkage between the first and second end positions. The actuator 110 and the four-bar-linkage 114 are part of a depth adjustment means that adjusts the working depth of the first ground engaging tool 122a by moving the first ground engaging tool 122a with respect to the main frame 112. The actuator 110 according to the embodiment of FIG. 7 is a hydraulic cylinder. The chambers of the hydraulic cylinder may be connected to the existing hydraulic system of a corresponding towing vehicle (not shown), which will supply pressurised hydraulic fluid to actuate movement of the four-bar-linkage 114. A first end 150 of the actuator 110 is connected to the main frame 112. A second end 152 of the actuator 110 is connected to the coupler link 120 of the four-bar-linkage 114. Accordingly, in the embodiment of FIG. 7, the second pivotable link 118 will be moved towards its first end position indicated by line L1 when the hydraulic cylinder is retracted. Similarly, the second pivotable link 118 will be moved in the opposite direction, towards its second end position indicated by line L2, when the hydraulic cylinder is extended. Mechanical end stops may be provided to limit movement of the four-bar-linkage 114 and potentially lock four-bar-linkage 114 into its first and/or second end position.

In view of the above, an extension of the actuator 110 in FIG. 7 will cause the ground engaging tool 122a to be raised, i.e. a decrease in working depth. Similarly, a retraction of actuator 110 will cause the first ground engaging tool 122a to be pushed further into the soil, thereby increasing the working depth.

Compared to the embodiment shown in FIGS. 1A to 1C, in which all of the ground engaging tools are adjusted simultaneously by changing the ground clearance of the main frame 12 via implement wheel 20 and the headstock 14, FIG. 7 shows an embodiment, in which each of the ground engaging tools may be adjusted independently. It will be understood that a similar arrangement may be provided for a depth adjustment of the skimmers of the plough implement. It follows that the ground engaging tools, whether they are plough bodies or skimmers, may, in some embodiments, be individually adjustable with a depth adjustment apparatus such as the one shown in FIG. 7.

Utilising the individual depth adjustment apparatus of FIG. 7, the method of the present disclosure may be used to separately adjust the depth of some or each of the ground engaging tools of the plough implement on basis of the control-data received. This embodiment will allow more precise adjustment of the plough implement 10. In one example, the method of the present disclosure may comprise changing the working depth of some but not all of the ground engaging tools, e.g. some but not all of the plough bodies currently in operation. For example, the method may include changing the working depth of ground engaging tools that are about to collide with an obstacle. Alternatively or additionally, the method may comprise changing the working depth of ground engaging tools that are in contact with harder or softer soils than other ground engaging tools.

In the embodiment of FIG. 7, the plough implement 10 may include one or more sensors 224a, 224b that are connected to the plough implement 10. In one example, a contact-less sensor may be provided in front of each ground engaging tool. Of course, as described above, other sensors may also be provided on the work vehicle 7. The one or more sensors connected to the plough implement 10 may be used to determine live field-data associated with various different field conditions, such as the field contour, moisture contents of the soil, compaction levels of the soil or any other suitable field condition that may influence the working depth of the ground engaging tool 122a.

The first sensor 224a of this example is arranged in front of the ground engaging tool 122a to determine parameters of the soil immediately in front of the corresponding ground engaging tool 122a. The sensor 224a is further connected to a control unit 202, 204 which may either be associated with the plough implement 10 or the agricultural work vehicle 7.

A second sensor 224b is arranged on the actuator 110 of the depth adjustment apparatus shown in FIG. 7. The second sensor 224b may be a position sensor for determining the position of the hydraulic cylinder of the actuator 110. It will be appreciated that the position of the hydraulic cylinder of the actuator 110 is indicative of the working depth of the ground engaging tool 122a. Accordingly, the data provided by the second sensor 224b allow the control unit 202, 204 to determine a current working depth of the ground engaging tool 122a. As described above, the control unit 202, 204 may use the data provided by the first and second sensors 224a, 224b to determine a desired working depth on the basis of the control-data received from the first sensor 224a and compare the desired working depth with a current working depth determined on the basis of the data received from the second sensor 224b.

It should be appreciated that the depth adjustment means shown in FIG. 7 is only one embodiment of many various possibilities. For example, the four bar linkage 114 of the depth adjustment apparatus may also be replaced by a single pivotable link or an extendable support leg that is arranged at an oblique angle with respect to the main frame. Similarly, the actuator 110 may be replaced by any other suitable actuator, such as an electric motor or a pneumatic actuator.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. A method for adjusting a working depth of a plough implement, the plough implement comprising a plurality of ground engaging tools configured to penetrate and move soil and a depth adjustment apparatus, wherein the plurality of ground engaging tools comprises at least one skimmer and at least one plough body, the depth adjustment apparatus is configured to adjust a working depth of the at least one skimmer, and the method comprises:

receiving, via a control unit comprising one or more processors and one or more memory devices, control data comprising field data indicative of a furrow depth created by the at least one plough body; and automatically controlling, via the control unit, the depth adjustment apparatus to adjust the working depth of the at least one skimmer on the basis of the control data received.

2. The method of claim 1, wherein the field data is further indicative of one or more of:
- a moisture content of the soil;
- soil compaction levels of the soil;
- a temperature of the soil;
- contours of the field;
- a type of plant residues to be buried;
- a soil type;
- an ability of the soil to drain water; or
- a time of the year.

3. The method of claim 1, wherein the field data is further indicative of a boundary between a work area and a headland of a field.

4. The method of claim 1, wherein a plurality of candidate field data is stored in a database and automatically controlling the depth adjustment apparatus includes:
- receiving, via the control unit, location data of the plough implement within a field; and
- using, via the control unit, the location data to select one of the candidate field data as the field data.

5. The method of claim 1, wherein the control data further comprises implement data associated with operation of the plough implement.

6. The method of claim 5, wherein the implement data is indicative of one or more of:
- a speed of the plough implement and/or an associated agricultural work vehicle;
- a ploughing resistance experienced by the plough implement or the plurality of ground engaging tools;
- a wheel slip experienced by a wheel of the plough implement and/or the associated agricultural work vehicle; or
- a lateral distance between adjacent ground engaging tools of the plurality of ground engaging tools.

7. The method of claim 1, comprising retrieving and/or calculating, via the control unit, a desired working depth corresponding to the control data received.

8. The method of claim 7, comprising identifying a current working depth of the at least one skimmer, comparing the current working depth to the desired working depth, and adjusting the working depth of the at least one skimmer when a difference between the current and the desired working depth exceeds or falls below a threshold value.

9. The method any of claim 1, wherein the plough implement comprises a main frame, which is transferable between a first configuration, in which a first skimmer of the at least one skimmer is in a working position, and a second configuration, in which a second skimmer of the at least one skimmer is in a working position, and wherein controlling the depth adjustment apparatus comprises simultaneously and equally adjusting the working depth of the first and the second skimmers.

10. The method of claim 1, wherein the field data is also indicative of a furrow width created by the at least one plough body.

11. The method of claim 1, wherein the plough implement comprises a second depth adjustment apparatus, the depth adjustment apparatus is configured to adjust the working depth of a first skimmer of the at least one skimmer, the second depth adjustment apparatus is configured to adjust a working depth of a second skimmer of the at least one skimmer, automatically controlling the depth adjustment apparatus comprises automatically controlling the depth adjustment apparatus to adjust the working depth of the first skimmer, and the method comprises automatically controlling, via the control unit, the second depth adjustment apparatus to adjust the working depth of the second skimmer on the basis of the control data received.

12. An agricultural plough implement comprising:
- a plurality of ground engaging tools configured to penetration and move soil and a depth adjustment apparatus, wherein the plurality of ground engaging tools comprises at least one skimmer and at least one plough body, and the depth adjustment apparatus is configured to adjust a working depth of the at least one skimmer;
- a control unit comprising one or more processors and one or more memory devices, wherein the control unit is configured to receive control data comprising field data indicative of a furrow depth created by the at least one plough body;
- wherein the control unit is configured to automatically control the depth adjustment apparatus to adjust the working depth of the at least one skimmer on the basis of control data the received by the control unit.

* * * * *